(12) United States Patent
Knowles et al.

(10) Patent No.: US 12,141,092 B2
(45) Date of Patent: Nov. 12, 2024

(54) INSTRUCTION SET

(71) Applicant: Graphcore Limited, Bristol (GB)

(72) Inventors: Simon Christian Knowles, Corston (GB); Daniel John Pelham Wilkinson, West Harptree (GB); Richard Luke Southwell Osborne, Bristol (GB); Alan Graham Alexander, Wotton-Under-Edge (GB); Stephen Felix, Bristol (GB); Jonathan Mangnall, Portishead (GB); David Lacey, Cheltenham (GB)

(73) Assignee: GRAPHCORE LIMTIED, Bristol (GB)

( * ) Notice: Subject to any disclaimer, the term of this patent is extended or adjusted under 35 U.S.C. 154(b) by 400 days.

(21) Appl. No.: 17/658,124

(22) Filed: Apr. 6, 2022

(65) Prior Publication Data

US 2022/0253399 A1 Aug. 11, 2022

Related U.S. Application Data

(63) Continuation of application No. 15/886,131, filed on Feb. 1, 2018, now Pat. No. 11,321,272.

(30) Foreign Application Priority Data

Oct. 20, 2017 (GB) ..................... 1717299

(51) Int. Cl.
*G06F 15/173* (2006.01)
*G06F 8/41* (2018.01)
(Continued)

(52) U.S. Cl.
CPC ........ *G06F 15/17312* (2013.01); *G06F 8/456* (2013.01); *G06F 9/3885* (2013.01);
(Continued)

(58) Field of Classification Search
CPC .. G06F 15/17312; G06F 8/456; G06F 9/3885; G06F 15/80
See application file for complete search history.

(56) References Cited

U.S. PATENT DOCUMENTS

| 5,083,265 A * | 1/1992 | Valiant ..................... G06F 9/52 712/21 |
| 5,434,861 A | 7/1995 | Pritty et al. |

(Continued)

FOREIGN PATENT DOCUMENTS

| CN | 102782672 | 11/2012 |
| EP | 0588104 | 3/1994 |

(Continued)

OTHER PUBLICATIONS

Examination Report dated Dec. 1, 2020 for EP Patent Application No. 18200106.5. 9 pages.
(Continued)

*Primary Examiner* — Won Tae C Kim
(74) *Attorney, Agent, or Firm* — HAYNES AND BOONE, LLP

(57) ABSTRACT

The invention relates to a computer program comprising a sequence of instructions for execution on a processing unit having instruction storage for holding the computer program, an execution unit for executing the computer program and data storage for holding data, the computer program comprising one or more computer executable instruction which, when executed, implements: a send function which causes a data packet destined for a recipient processing unit to be transmitted on a set of connection wires connected to the processing unit, the data packet having no destination identifier but being transmitted at a predetermined transmit time; and a switch control function which causes the processing unit to control switching circuitry to connect a set of
(Continued)

connection wires of the processing unit to a switching fabric to receive a data packet at a predetermined receive time.

24 Claims, 9 Drawing Sheets

(51) Int. Cl.
  *G06F 9/38* (2018.01)
  *G06F 15/80* (2006.01)
(52) U.S. Cl.
  CPC .. *G06F 15/17325* (2013.01); *G06F 15/17337* (2013.01); *G06F 15/80* (2013.01)

(56) References Cited

U.S. PATENT DOCUMENTS

| | | | |
|---|---|---|---|
| 5,734,826 | A | 3/1998 | Olnowich et al. |
| 5,754,789 | A | 5/1998 | Nowatzyk et al. |
| 6,011,793 | A | 1/2000 | Smith |
| 6,876,652 | B1 | 4/2005 | Bell et al. |
| 7,100,021 | B1 | 8/2006 | Marshall et al. |
| 7,818,725 | B1 | 10/2010 | Agarwal et al. |
| 7,904,905 | B2 | 3/2011 | Cervini |
| 8,127,111 | B1 | 2/2012 | Wentzlaff et al. |
| 8,745,604 | B1 | 6/2014 | Agarwal |
| 9,158,575 | B2 | 10/2015 | Smith |
| 2004/0172631 | A1 | 9/2004 | Howard |
| 2008/0089329 | A1 | 4/2008 | Ajima |
| 2012/0089812 | A1 | 4/2012 | Smith |
| 2012/0254881 | A1 | 10/2012 | Hamamoto et al. |
| 2013/0070588 | A1 | 3/2013 | Steele et al. |
| 2014/0006724 | A1 | 1/2014 | Gray et al. |
| 2014/0137129 | A1 | 5/2014 | Jacob et al. |

FOREIGN PATENT DOCUMENTS

| | | |
|---|---|---|
| JP | 2005032018 | 2/2005 |
| JP | 2013069189 | 4/2013 |
| JP | 2017138780 | 8/2017 |
| TW | 201610688 | 3/2016 |
| TW | 201633759 | 9/2016 |
| TW | 201724764 | 7/2017 |

OTHER PUBLICATIONS

Anonymous, "Time-triggered architecture—Wikipedia". Jul. 3, 2017. Retrieved from Internet URL:https://en.wikipedia.org/w/index.phptitle=Time- triggered_architecture oldid=788784108 [retrieved on Apr. 30, 2020].
Carle, Thomas et al., "Static Mapping of Real-Time Applications onto Massively Parallel Processor Arrays".
2014 14th International Conference on Application of Concurrency to System Design, IEEE, Jun. 23, 2014 (Jun. 23, 2014), pp. 112-121.
Lee, Walter et al., "Space-Time Scheduling of Instruction-Level Parallelism on a Raw Machine". 1998. M.I.T. Laboratory for Computer Science. http://www.cag.lcs.mit.edu/raw. pp. 46-57.
Examination Report dated Feb. 26, 2021 for EP Patent Application No. 18200107.3. 7 pages.
Office Action and Search Report dated Oct. 28, 2020 for Canadian Patent Application No. 3,021,450. 4 pages.
Third Party Observations Submission dated Jun. 13, 2020 for Patent Application GB1717304.8.
Third Party Observations Submission dated Jun. 17, 2020 for Patent Application EP20180200106.
Office Action dated May 19, 2020 for Taiwanese Patent Application No. 107136963.
Office Action dated Feb. 25, 2020 for Korean Patent Application No. 10-2018-0126038.
Office Action dated Mar. 18, 2020 for Korean Patent Application No. 10-2018-0124595.
Office Action dated Feb. 21, 2020 for Korean Patent Application No. 10-2018-0126043.
Third Party Submission in Patent Application EP20180200106 Observations, Feb. 10, 2020.
Third Party Submission in Patent Application GB1717304.8 Observations, Feb. 7, 2020.
Office Action for Taiwanese Application No. 107136956 dated Dec. 18, 2019.
Extended European Search Report for European Application No. 18200106.5 dated Mar. 14, 2019.
Combined Search and Examination Report for British Application No. GB1717304.8 dated Apr. 15, 2019.
Ding et al., Switch design to enable predictive multiplexed switching in multiprocessor networks. Proceedings of the.
19th IEEE International Parallel and Distributed Processing Symposium, IPDPD05. 2005.10 pages.
Liang et al., aSOC: A scalable, single-chip communications architecture. Proceedings of the International Conference.
On Parallel Architectures and Compilation Techniques. 2000: 37-46.
Office Action for Taiwanese Application No. 107136958 dated Nov. 1, 2019.
Office Action for Taiwanese Application No. 107136963 dated Nov. 19, 2019.
Third Party Submission in U.S. Appl. No. 15/886,009, Preissuance Submission, Feb. 26, 2020.
Combined Search and Examination Report, dated Apr. 15, 2019 for Patent Application No. GB1717299.0.
European Search Report, dated Mar. 18, 2019 for Patent Application No. 18200107.3.
Author Unknown, "Instruction Set Architecture", dated Oct. 18, 2017, Retrieved from the Internet. Wikipedia, URL: https://en.wikipedia.org/w/index.phptitle=instruction_set_architecture oldid= 805896069. pp. 1-11.
Author Unknown, "Synchronization", dated Sep. 19, 2017, Retrieved from the Internet, Wikipedia, URL: https://en.wikipedia.org/w/index.phptitle=Synchronization_(computer_science) oldid=801376314. pp. 1-9.
Bhuyan L., et al. "Performance of Multiprocessor Interconnection Networks", dated Feb. 1, 1989. vol. 22, No. 2. pp. 25-27.
Tomas L., et al. "Bandwidth of Crossbar and Multiple-Bus Connections for Multiprocessors", IEEE Transactions on Computers, vol. c-31, No. 12. Dec. 12, 1982. 8 pages.
Combined Search and Examination Report, dated Apr. 12, 2019, for Patent Application No. GB1816892.2.
Cha et al., H-BSP: A Hierarchical BSP Computation Model. The Journal of Supercomputing, Feb. 2001;18(2):179-200.
Kapre et al., An NoC Traffic Compiler for Efficient FPGA Implementation of Sparse Graph-Oriented Workloads. International Journal of Reconfigurable Computing. vol. 2011 (2011), Article ID 745147. 15 pages.
Valiant, A bridging model for parallel computation. Communications of the ACM, Aug. 1990;33(8):103-11.
Office Action dated Nov. 9, 2022, for Chinese Patent Application No. 201811228379.6.
Dou, Yong et al., "Coarse-Grained Reconfigurable Array Architecture Supporting Cyclic Automatic Assembly Line", Science in China Series F-Information Sciences, vol. 38, Issue 4: pp. 579-591, Published Apr. 20, 2008.

\* cited by examiner

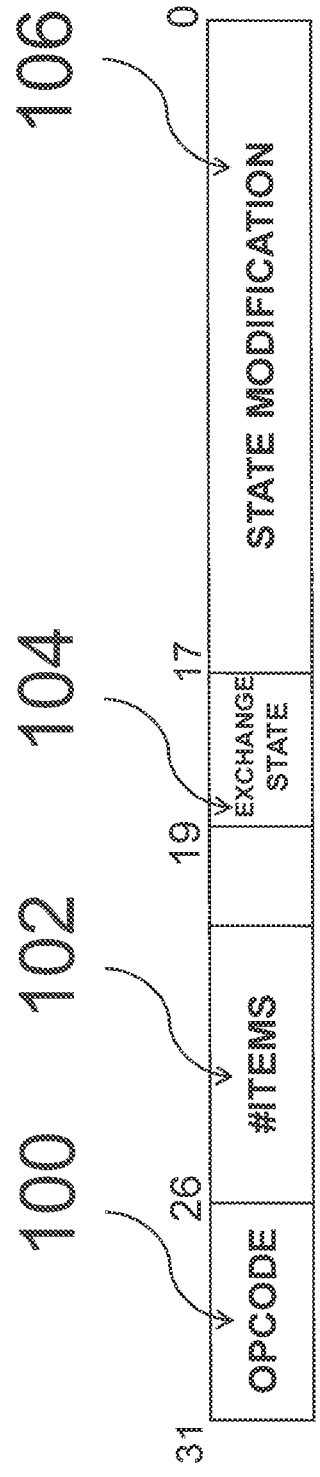
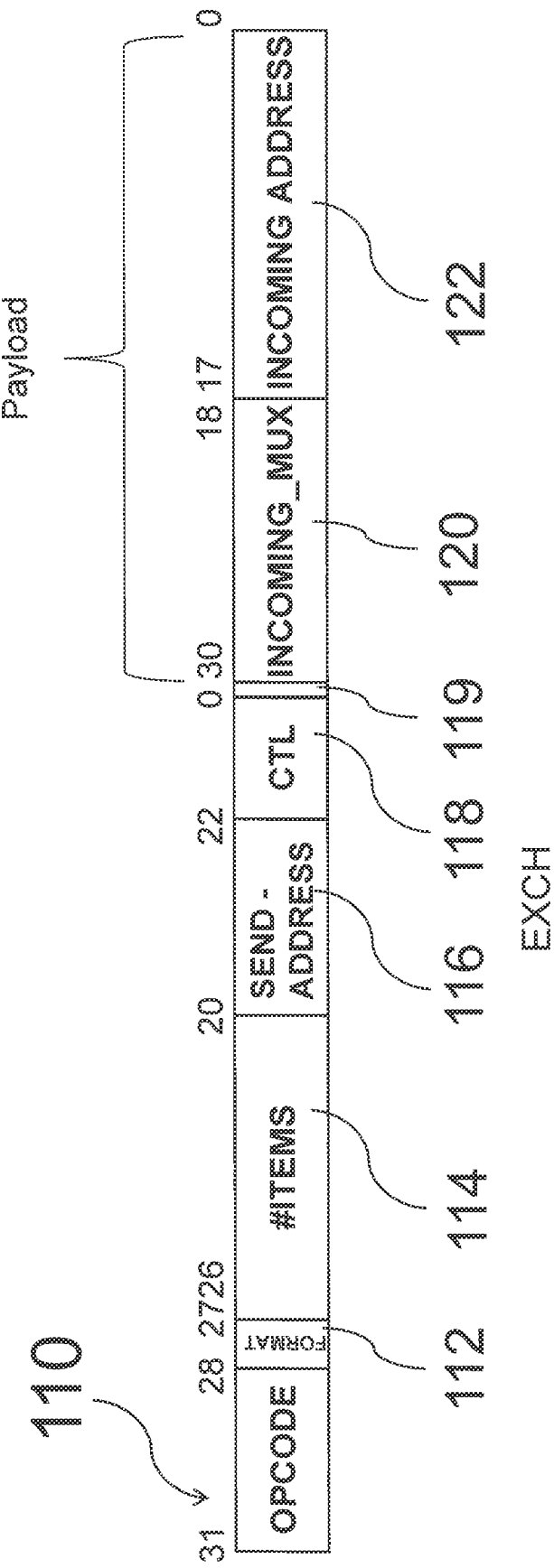

INSTRUCTION SET

CROSS-REFERENCE TO RELATED APPLICATIONS

This application is a continuation of U.S. patent application Ser. No. 15/886,131 filed Feb. 1, 2018, which claims the priority benefit under 35 U.S.C. § 119 of United Kingdom Patent Application No. 1717299.0, filed Oct. 20, 2017, the entire contents of which are incorporated herein by reference in their entireties.

TECHNICAL FIELD

The present disclosure relates to synchronizing the workloads of multiple different tiles in a processor comprising multiple tiles, each tile comprising a processing unit with local memory. Particularly, the disclosure relates to bulk synchronous parallel (BSP) computing protocol, whereby each of a group of tiles must complete a compute phase before any of the tiles in the group can proceed to an exchange phase.

BACKGROUND

Parallelism in computing takes different forms. Program fragments may be organised to execute concurrently (where they overlap in time but may share execution resources) or in parallel where they execute on different resources possibly at the same time.

Parallelism in computing can be achieved in a number of ways, such as by means of an array of multiple interconnected processor tiles, or a multi-threaded processing unit, or indeed a multi-tile array in which each tile comprises a multi-threaded processing unit.

When parallelism is achieved by means of a processor comprising an array of multiple tiles on the same chip (or chips in the. same integrated circuit package), each tile comprises its own separate respective processing unit with local memory (including program memory and data memory). Thus separate portions of program code can be run concurrently on different tiles. The tiles are connected together via an on-chip interconnect which enables the code run on the different tiles to communicate between tiles. In some cases the processing unit on each tile may take the form of a barrel-threaded processing unit (or other multi-threaded processing unit). Each tile may have a set of contexts and an execution pipeline such that each tile can run multiple interleaved threads concurrently.

In general, there may exist dependencies between the portions of a program running on different tiles in the array. A technique is therefore required to prevent a piece of code on one tile running ahead of data upon which it is dependent being made available by another piece of code on another tile. There are a number of possible schemes for achieving this, but the scheme of interest herein is known as "bulk synchronous parallel" (BSP). According to BSP, each tile performs a compute phase and an exchange phase in an alternating manner. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet begin a new compute phase until that tile has finished its exchange phase. Further, according to this form of BSP principle, a barrier synchronization is placed at the juncture transitioning from the compute phase into the exchange phase, or transitioning from the exchange phases into the compute phase, or both. That is it say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both. When used herein the phrase "between a compute phase and an exchange phase" encompasses all these options.

An example use of multi-threaded and/or multi-tiled parallel processing is found in machine intelligence. As will be familiar to those skilled in the art of machine intelligence, machine intelligence algorithms "are capable of producing knowledge models" and using the knowledge model to run learning and inference algorithms. A machine intelligence model incorporating the knowledge model and algorithms can be represented as a graph of multiple interconnected nodes. Each node represents a function of its inputs. Some nodes receive the inputs to the graph and some receive inputs from one or more other nodes. The output activation of some nodes form the inputs of other nodes, and the output of some nodes provide the output of the graph, and the inputs to the graph provide the inputs to some nodes. Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs, or other introspective forms of analysis can be performed on it.

The implementation of each node will involve the processing of data, and the interconnections of the graph correspond to data to be exchanged between the nodes. Typically, at least some of the processing of each node can be carried out independently of some or all others of the nodes in the graph, and therefore large graphs expose opportunities for huge parallelism.

SUMMARY

As mentioned above, a machine intelligence model representing the knowledge model and algorithmic information about how the knowledge model is used for learning and inference can generally be represented by a graph of multiple interconnected nodes, each node having a processing requirement on data. Interconnections of the graph indicate data to be exchanged between the nodes and consequently cause dependencies between the program fragments executed at the nodes. Generally, processing at a node can be carried out independently of another node, and therefore large graphs expose huge parallelism. A highly distributed parallel machine is a suitable machine structure for computation of such machine intelligence models. This feature enables a machine to be designed to make certain time deterministic guarantees.

A factor of knowledge models which is exploited in the present disclosure is the generally static nature of the graph. That is to say that the structure of nodes and graph comprising the graph does not usually change during execution of machine intelligence algorithms. The inventors have made a machine which makes certain time deterministic guarantees to optimise computation on machine intelligence models. This allows a compiler to partition and schedule work across the nodes in a time deterministic fashion. It is this time determinism which is utilised in following described embodiments for significant optimisations in designing a computer optimised to process workloads based on knowledge models.

According to one aspect of the present invention there is provided a computer program comprising a sequence of instructions for execution on a processing unit having instruction storage for holding the computer program, an execution unit for executing the computer program and data storage for holding data, the computer program comprising one or more computer executable instructions which when executed implements;

a send function which causes a data packet destined for a recipient processing unit to be transmitted on a set of connection wires connected to the processing unit, the data packet having no destination identifier but being transmitted at a predetermined transmit time; and a switch control function which when executed causes the processing unit to control switching circuitry to connect a set of connection wires of the processing unit to a switching fabric to receive a data packet at a predetermined receive time.

There may be two separate instructions: a send instruction and a switch control instruction. Features of the send instruction can include that the send instruction defines a send address by defining a location in the instruction storage from which the data packet is to be sent. Alternatively, the send instruction does not explicitly define a send address but implicitly defines a registry in which the send address is held. The send instruction may define a number of packets to be sent, each packet being associated with a different transmit time. The computer program can comprise a further instruction for updating the send address in the implicitly defined register.

The computer program can include at least one further instruction which defines a memory pointer update function which updates the memory pointer identifying a memory location in the data storage for storing the data packet which is received at the recipient processing unit.

An artefact of the instruction set described herein is that it can include merge instructions, which merge functions of a transmitting processing unit and a recipient processing unit, such that the processing unit can operate as a transmitting unit and a recipient unit within a single execution cycle. One such merge instruction merges the send function with the switch control function. Another such merge instruction merges the send function and the memory pointer update function. A further merge instruction merges the send function, switch control function and memory pointer update function such that all three functions can be accomplished in a single execution cycle.

Instructions can be issued in a first bit width which matches a bit width of a fetch stage of the execution unit. Merged instructions which merge two functions can also be a first bit width. One way of implementing a merge instruction which merges three functions is for the instruction of a first bit width to identify an operand also of the first bit width. The operand implements the switch control function and the memory pointer update function. Alternatively, an instruction which merges three functions may be of a second bit which is twice the bit width of a fetch stage of the execution unit but which is treated as a single instruction once issued.

A merge instruction format may be a common format, wherein an opcode portion designates whether it merges the send function with the memory pointer update function or the switch control function. An exchange state can hold information for the switch control function or information for the memory pointer update function, depending on the opcode portion.

The computer program can include a synchronisation instruction which generates an indication when a compute phase of the processing unit is being completed. This enables a computer program to operate in a context where the processing units form part of a barrier synchronisation protocol which has a compute phase and an exchange phase. The send instruction can be executed in the exchange phase.

The computer program can be stored on a computer readable media which is non-transmissible. Alternatively it can be implemented as a transmissible signal.

Another aspect of the invention comprises a processing unit comprising instruction storage, an execution unit configured to execute a computer program and data storage for holding data, wherein the instruction storage holds a computer program as defined above.

Another aspect of the invention comprises a computer comprising one or more die in an integrated package, the computer comprising a plurality of processing units, each processing unit having instruction storage for holding a computer program, an execution unit configured to execute the computer program and data storage for holding data, wherein the instruction storage for each processing unit holds a computer program as defined above.

BRIEF DESCRIPTION OF THE DRAWINGS

For a better understanding of the present invention and to show how the same may be carried into effect reference will now be made by way of example to the following drawings.

FIGS. 8 to 11 illustrate instruction formats of different instructions usable in a time deterministic architecture.

DETAILED DESCRIPTION OF THE EMBODIMENTS

Figure 1:
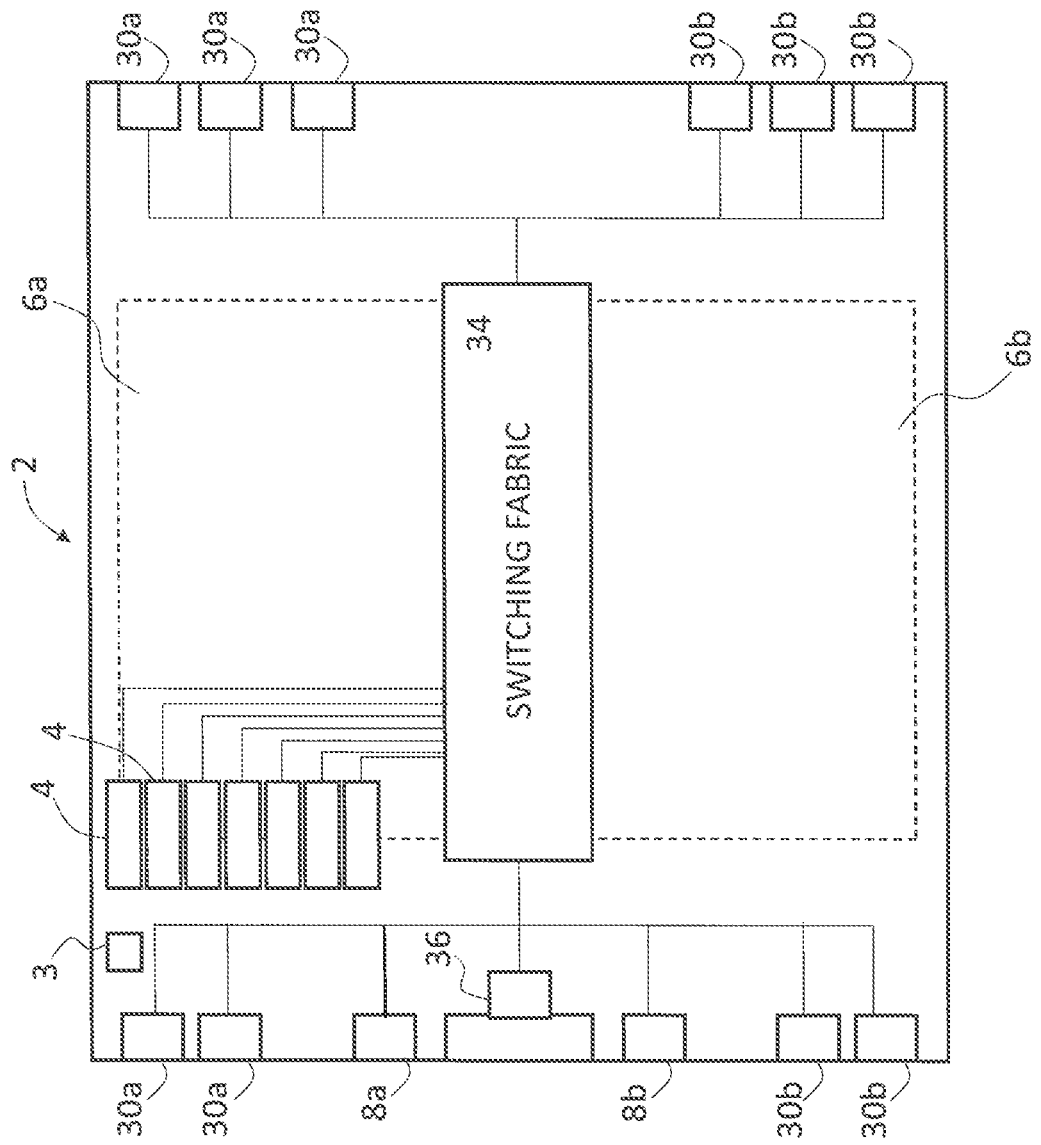
FIG. 1 illustrates schematically the architecture of a single chip processor.

FIG. 1 illustrates schematically the architecture of a single chip processor 2. The processor is referred to herein as an IPU (Intelligence Processing Unit) to denote its adaptivity to machine intelligence applications. In a computer, the single chip processors can be connected together as discussed later, using links on the chip, to form a computer. The present description focuses on the architecture of the single chip processor 2. The processor 2 comprises multiple processing units referred to as tiles. In one embodiment, there are 1216 tiles organised in arrays 6a, 6b which are referred to herein as "North" and "South". In the described example, each array has eight columns of 76 tiles (in fact generally there will be 80 tiles, for redundancy purposes). It will be appreciated that the concepts described herein extend to a number of different physical architectures—one example is given here to aid understanding. The chip 2 has two chip to host links 8a, 8b and four chip to chip links 30a, 30b arranged on the "West" edge of the chip 2. The chip 2 receives work from a host (not shown) which is connected to the chip via one of the card-to-host links in the form of input data to be processed by the chip 2. The chips can be connected together into cards by a further six chip-to-chip links 30a, 30b arranged along the "East" side of the chip. A host may access a computer which is architected as a single chip processor 2 as described herein or a group of multiple interconnected single chip processors 2 depending on the workload from the host application.

The chip 2 has a clock 3 which controls the timing of chip activity. The clock is connected to all of the chip's circuits and components. The chip 2 comprises a time deterministic switching fabric (or interconnect) 34 to which all tiles and links are connected by sets of connection wires, the switching fabric being stateless, i.e. having no program visible state. Each set of connection wires is fixed end to end. The wires are pipelined. In this embodiment, a set comprises 32 data wires plus control wires, e.g. a valid bit. Each set can carry a 32-bit data packet, but note herein that the word "packet" denotes a set of bits representing a datum (sometimes referred to herein as a data item), perhaps with one or more valid bit. The "packets" do not have headers or any form of destination identifier which permits an intended recipient to be uniquely identified, nor do they have end-of-packet information. Instead, they each represent a numerical or logical value input to or output from a tile. Each tile has its own local memory (described later). The tiles do not share memory. The switching fabric constitutes a cross set of connection wires only connected to multiplexers and tiles as described later and does not hold any program visible state. The switching fabric is considered to be stateless and does not use any memory. Data exchange between tiles is conducted on a time deterministic basis as described herein. A pipelined connection wire comprises a series of temporary stores, e.g. latches or flip flops which hold datum for a clock cycle before releasing it to the next store. Time of travel along the wire is determined by these temporary stores, each one using up a clock cycle of time in a path between any two points.

Figure 2:
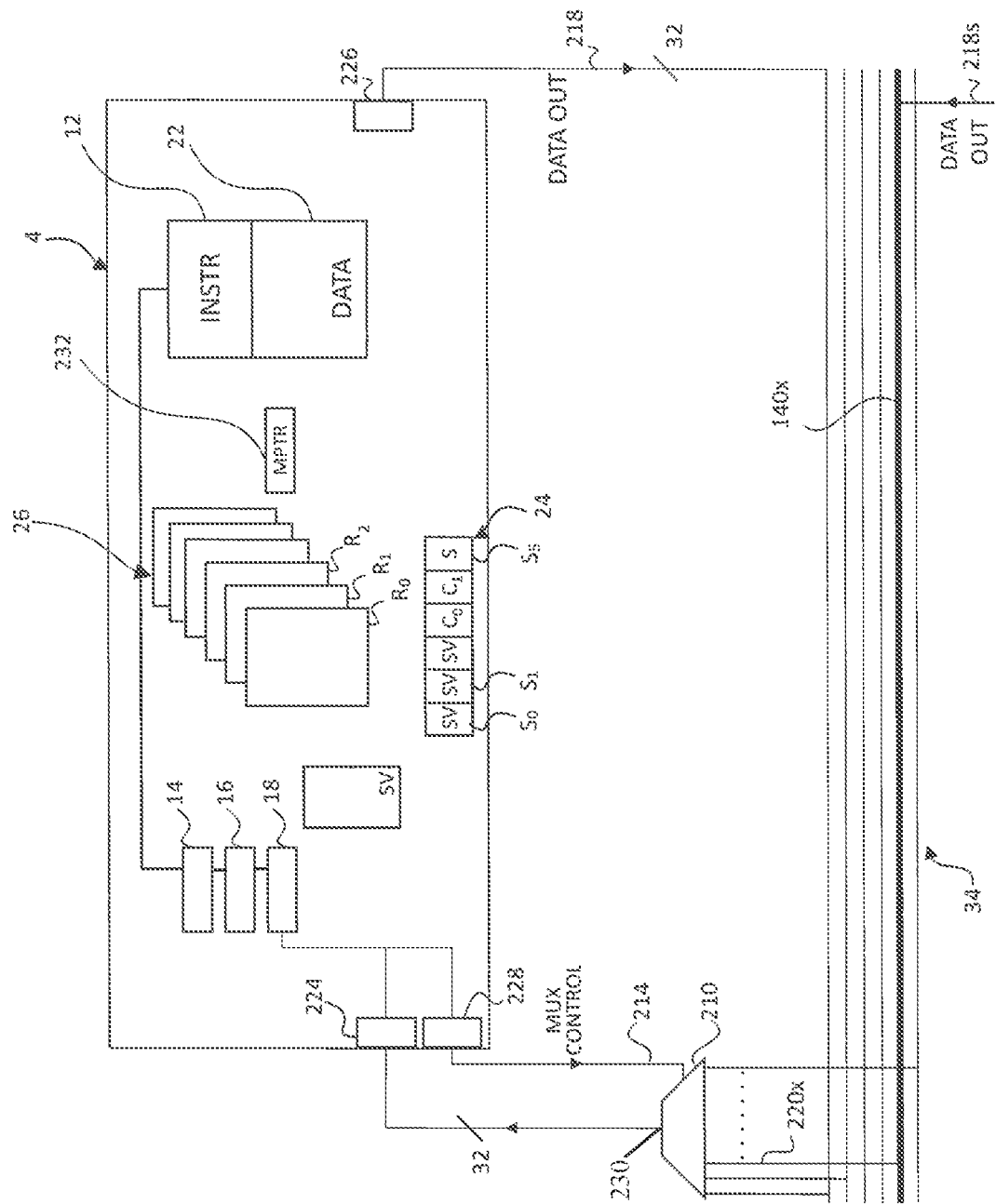
FIG. 2 is a schematic diagram of a tile connected to the switching fabric.

FIG. 2 illustrates an example tile 4 in accordance with embodiments of the present disclosure. In the tile, multiple threads are interleaved through a single execution pipeline. The tile 4 comprises: a plurality of contexts 26 each arranged to represent the state of a different respective one of a plurality of threads; a shared instruction memory 12 common to the plurality of threads; a shared data memory 22 that is also common to the plurality of threads; a shared execution pipeline 14, 16, 18 that is again common to the plurality of threads; and a thread scheduler 24 for scheduling the plurality of threads for execution through the shared pipeline in an interleaved manner. The thread scheduler 24 is schematically represented in the diagram by sequence of time slots $S_0 \ldots S_5$, but in practice is a hardware mechanism managing program counters of the threads in relation to their time slots. The execution pipeline comprises a fetch stage 14, a decode stage 16, and an execution stage 18 comprising an execution unit (EXU) and a load/store unit (LSU). Each of the contexts 26 comprises a respective set of registers $R_0$, $R_1 \ldots$ for representing the program state of the respective thread.

The fetch stage 14 is connected to fetch instructions to be executed from the instruction memory 12, under control of the thread scheduler 24. The thread scheduler 24 is configured to control the fetch stage 14 to fetch instructions from the local program for execution in each time slot as will be discussed in more detail below.

The fetch stage 14 has access to a program counter (PC) of each of the threads that is currently allocated to a time slot. For a given thread, the fetch stage 14 fetches the next instruction of that thread from the next address in the instruction memory 12 as indicated by the thread's program counter. Note that an instruction as referred to herein, means a machine code instruction, i.e. an instance of one of the fundamental instructions of the computer's instruction set, made up of an opcode and zero or more operands. Note too that the program loaded into each tile is determined by a processor or compiler to allocate work based on the graph of the machine intelligence model being supported.

The fetch stage 14 then passes the fetched instruction to the decode stage 16 to be decoded, and the decode stage 16 then passes an indication of the decoded instruction to the execution stage 18 along with the decoded addresses of any operand registers of the current context specified in the instruction, in order for the instruction to be executed.

In the present example, the thread scheduler 24 interleaves threads according to a round-robin scheme whereby, within each round of the scheme, the round is divided into a sequence of time slots $S_0$, $S_1$, $S_2$, $S_3$, each for executing a respective thread. Typically each slot is one processor cycle long and the different slots are evenly sized (though not necessarily so in all possible embodiments). This pattern then repeats, each round comprising a respective instance of each of the time slots (in embodiments in the same order each time, though again not necessarily so in all possible embodiments). Note therefore that a time slot as referred to herein means the repeating allocated place in the sequence, not a particular instance of the time slot in a given repetition of the sequence. In the illustrated embodiment, there are eight time slots, but other numbers are possible. Each time slot is associated with a hardware resource, e.g. a register, for managing the context of an executing thread.

One of the contexts 26, labelled SV, is reserved for a special function, to represent the state of a "supervisor" (SV) whose job it is to coordinate the execution of "worker" threads. The supervisor can be implemented as a program organised as one or more supervisor threads which may run concurrently. The supervisor thread may also be responsible for performing barrier synchronisations described later or may be responsible for exchanging data on and off the tile, as well as in and out of local memory so that it can be shared between the worker threads between computations. The thread scheduler 24 is configured so as, when the program as a whole starts, it begins by allocating the supervisor thread to all of the time slots, i.e. so the supervisor SV starts out running in all time slots $S_0 \ldots S_5$. However, the supervisor thread is provided with a mechanism for, at some subsequent point (either straight away or after performing one or more supervisor tasks), temporarily relinquishing each of the slots in which it is running to a respective one of the worker threads. In FIG. 2, $C_0$, $C_1$ denote slots to which a worker thread has been allocated. This is achieved by the supervisor thread executing a relinquish instruction, called "RUN" by way of example herein. In embodiments this instruction takes two operands: an address of a worker thread in the instruction memory 12 and an address of some data for that thread in the data memory 22:
RUN task_addr, data_addr Each worker thread is a codelet intended to represent a vertex in the graph and to execute atomically. That is all the data it consumes is available at launch and all the data it produces is not visible to other threads until it exits. It runs to completion (excepting error conditions). The data address may specify some data to be acted upon by the codelet. Alternatively, the relinquish instruction may take only a single operand specifying the address of the codelet, and the data address could be included in the code of the codelet; or the single operand could point to a data structure specifying the addresses of the codelet and data. Codelets may be run concurrently and independently of one another.

Either way, this relinquish instruction ("RUN") acts on the thread scheduler 24 so as to relinquish the current time slot, i.e. the time slot in which this instruction is executed, to the worker thread specified by the operand. Note that it is implicit in the relinquish instruction that it is the time slot in which this instruction is executed that is being relinquished (implicit in the context of machine code instructions means it doesn't need an operand to specify this—it is understood implicitly from the opcode itself). Thus the slot which is given away is the slot which the supervisor executes the relinquish instruction in. Or put another way, the supervisor is executing in the same space that it gives away. The supervisor says "run this codelet at this time slot", and then from that point onwards the slot is owned (temporarily) by the relevant worker thread. Note that when a supervisor uses a slot it does not use the context associated with that slot but uses its own context SV.

The supervisor thread SV performs a similar operation in each of the time slots, to give away all its slots $C_0$, $C_1$ to different respective ones of the worker threads. Once it has done so for the last slot, the supervisor pauses execution, because it has no slots in which to execute. Note that the supervisor may not give away all its slots, it may retain some for running itself.

When the supervisor thread determines it is time to run a codelet, it uses the relinquish instruction ("RUN") to allocate this codelet to the slot in which it executes the 'RUN' instruction.

Each of the worker threads in slots $C_0$, $C_1$ proceeds to perform its one or more computation tasks. At the end of its task(s), the worker thread then hands the time slot in which it is running back to the supervisor thread.

This is achieved by the worker thread executing an exit instruction ("EXIT"). In one embodiment, the EXIT instruction takes at least one operand and preferably only a single operand, exit state (e.g. a binary value), to be used for any purpose desired by the programmer to indicate a state of the respective codelet upon ending.
EXIT exit_state In one embodiment, the EXIT instruction acts on the scheduler 24 so that the time slot in which it is executed is returned back to the supervisor thread. The supervisor thread can then perform one or more subsequent supervisor tasks (e.g. barrier synchronization and/or movement of data in memory to facilitate the exchange of data between worker threads), and/or continue to execute another relinquish instruction to allocate a new worker thread (W4, etc.) to the slot in question. Note again therefore that the total number of threads in the instruction memory 12 may be greater than the number that the barrel-threaded processing unit 10 can interleave at any one time. It is the role of the supervisor thread SV to schedule which of the worker threads W0 . . . Wj from the instruction memory 12, at which stage in the overall program, are to be executed.

In another embodiment, the EXIT instruction does not need to define an exit state.

This instruction acts on the thread scheduler 24 so that the time slot in which it is executed is returned back to the supervisor thread. The supervisor thread can then perform one or more supervisor subsequent tasks (e.g. barrier synchronization and/or exchange of data), and/or continue to execute another relinquish instruction, and so forth.

Figure 3:
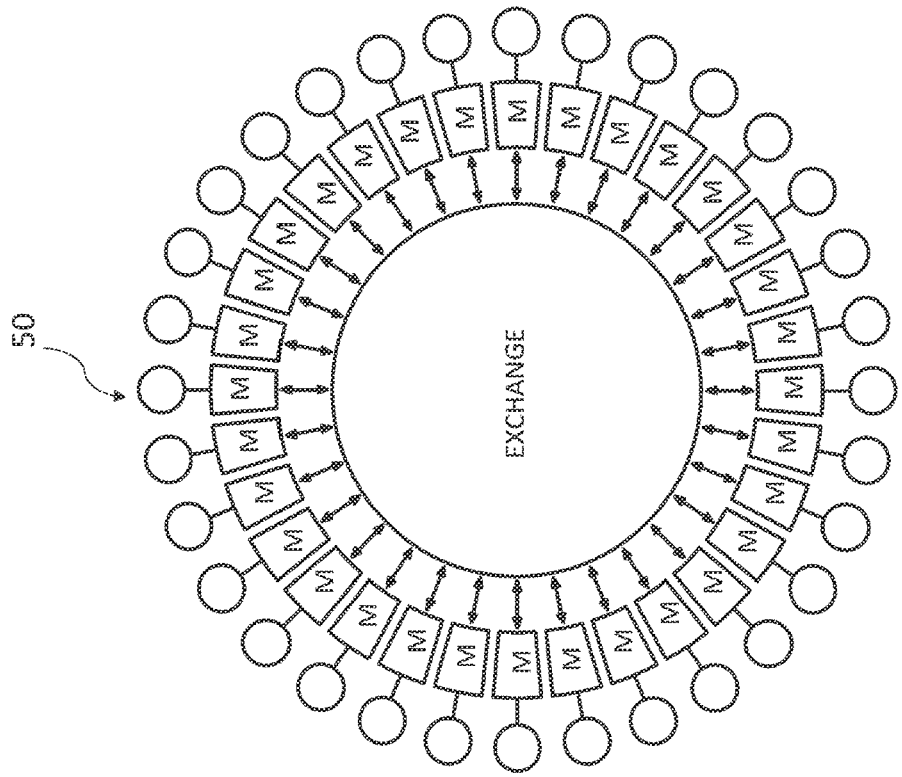
FIG. 3 is a diagram illustrating a BSP protocol.
Figure 3:
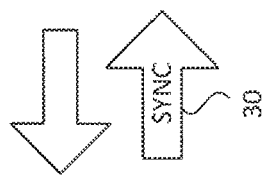
Figure 3:
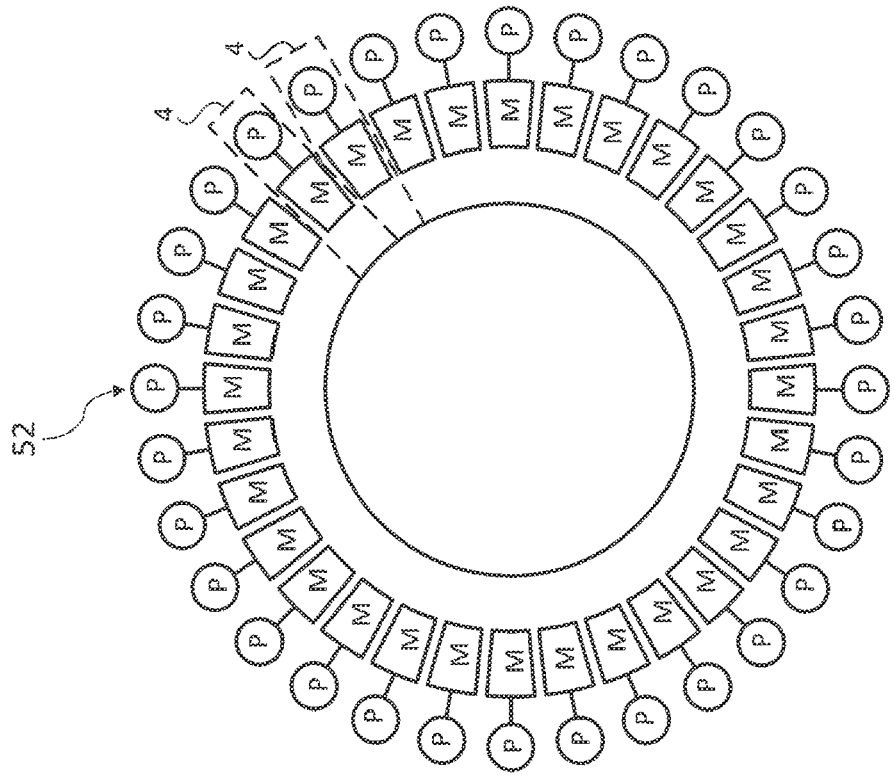

As briefly mentioned above, data is exchanged between tiles in the chip. Each chip operates a bulk synchronous parallel protocol (BSP), comprising a compute phase and an exchange phase. The protocol is illustrated for example in FIG. 3. The left-hand diagram in FIG. 3 represents a compute phase in which each tile 4 is in a phase where the stateful codelets execute in a processor P, corresponding to pipeline 14, 16, 18 in FIG. 2, on local memory M, corresponding to memory 12, 22 in FIG. 2. Although in FIG. 3 the tiles 4 are shown arranged in a circle this is for explanatory purposes only and does not reflect the actual architecture.

After the compute phase, there is a synchronisation denoted by arrow 30. To achieve this, a SYNC (synchronization) instruction is provided in the processor's instruction set. The SYNC instruction has the effect of causing the supervisor thread SV to wait until all currently executing workers W have exited by means of an EXIT instruction. In embodiments the SYNC instruction takes a mode as an operand (in embodiments its only operand), the mode specifying whether the SYNC is to act only locally in relation to only those worker threads running locally on the same processor module 4, e.g. same tile, or whether instead it is to apply across multiple tiles or even across multiple chips.
SYNC mode // mode∈{tile, chip, zone_1, zone_2}

BSP in itself is known in the art. According to BSP, each tile 4 performs a compute phase 52 and an exchange (sometimes called communication or message-passing) phase 50 in an alternating cycle. The compute phase and exchange phase are performed by the tile executing instructions. During the compute phase 52 each tile 4 performs one or more computation tasks locally on-tile, but does not communicate any results of these computations with any others of the tiles 4. In the exchange phase 50 each tile 4 is allowed to exchange (communicate) one or more results of the computations from the preceding compute phase to and/or from one or more others of the tiles in the group, but does not yet perform any new computations that have a potential dependency on a task performed on another tile 4 or upon which a task on another tile 4 might potentially have a dependency (it is not excluded that other operations such as internal control-related operations may be performed in the exchange phase). Further, according to the BSP principle, a barrier synchronization is placed at the juncture transitioning from the compute phases 52 into the exchange phase 50, or the juncture transitioning from the exchange phases 50 into the compute phase 52, or both. That is it say, either: (a) all tiles 4 are required to complete their respective compute phases 52 before any in the group is allowed to proceed to the next exchange phase 50, or (b) all tiles 4 in the group are required to complete their respective exchange phases 50 before any tile in the group is allowed to proceed to the next compute phase 52, or (c) both of these conditions is enforced. This sequence of exchange and compute phases may then repeat over multiple repetitions. In BSP terminology, each repetition of exchange phase and compute phase is referred to herein as a "superstep", consistent with usage in some prior descriptions of BSP. It is noted herein that the term "superstep" is sometimes used in the art to denote each of the exchange phase and compute phase.

The execution unit (EXU) of the execution stage 18 is configured so as, in response to the opcode of the SYNC instruction, when qualified by the on-chip (inter-tile) operand, to cause the supervisor thread in which the "SYNC chip" was executed to be paused until all the tiles 4 in the array 6 have finished running workers. This can be used to implement a barrier to the next BSP superstep, i.e. after all tiles 4 on the chip 2 have passed the barrier, the cross-tile program as a whole can progress to the next exchange phase 50.

Each tile indicates its synchronisation state to a sync module (sometimes referred to herein as a sync controller or synchronisation control) 36. Once it has been established that each tile is ready to send data, the synchronisation process 30 causes the system to enter an exchange phase which is shown on the right-hand side of FIG. 3. In this exchange phase, data values move between tiles (in fact between the memories of tiles in a memory-to-memory data movement). In the exchange phase, there are no computations which might induce concurrency hazards between tile programs. In the exchange phase, each datum moves along the connection wires on which it exits a tile from a transmitting tile to one or multiple recipient tile(s). At each clock cycle, datum moves a certain distance along its path (store to store), in a pipelined fashion. When a datum is issued from a tile, it is not issued with a header identifying a recipient tile. Instead, the recipient tile knows that it will be expecting a datum from a certain transmitting tile at a certain time. Thus, the computer described herein is time deterministic. Each tile operates a program which has been allocated to it by the programmer or by a compiler exercise, where the programmer or the compiler function has knowledge of what will be transmitted by a particular tile at a certain time and what needs to be received by a recipient tile at a certain time. In order to achieve this, SEND instructions are included in the local programs executed by the processor on each tile, where the time of execution of the SEND instruction is predetermined relative to the timing of other instructions being executed on other tiles in the computer. This is described in more detail later, but firstly the mechanism by which a recipient tile can receive a datum at a predetermined time will be described. Each tile 4 is associated with its own multiplexer 210: thus, the chip has 1216 multiplexers. Each multiplexer has 1216 inputs, each input being 32-bits wide (plus optionally some control bits). Each input is connected to a respective set of connecting wires 140$_x$ in the switching fabric 34. The connecting wires of the switching fabric are also connected to a data out set of connection wires 218 from each tile (a broadcast exchange bus, described later), thus there are 1216 sets of connecting wires which in this embodiment extend in a direction across the chip. For ease of illustration, a single emboldened set of wires 140$_x$ is shown connected to the data out wires 218$_s$, coming from a tile not shown in FIG. 2, in the south array 6b. This set of wires is labelled 140$_x$ to indicate that it is one of a number of sets of crosswires 140$_0$. 140$_{1215}$. As can now be seen from FIG. 2, it will be appreciated that when the multiplexer 210 is switched to the input labelled 220$_x$ then that will connect to the crosswires 140$_x$ and thus to the data out wires 218$_s$ of the tile (not shown in FIG. 2) from the south array 6b. If the multiplexer is controlled to switch to that input (220$_{sc}$) at a certain time, then the datum received on the data out wires which is connected to the set of connecting wires 140$_x$ will appear at the output 230 of the multiplexer 210 at a certain time. It will arrive at the tile 4 a certain delay after that, the delay depending on the distance of the multiplexer from the tile. As the multiplexers form part of switching fabric, the delay from the tile to the multiplexer can vary depending on the location of the tile. To implement the switching, the local programs executed on the tiles include switch control instructions (PUTi) which cause a multiplexer control signal 214 to be issued to control the multiplexer associated with that tile to switch its input at a certain time ahead of the time at which a particular datum is expected to be received at the tile. In the exchange phase, multiplexers are switched and packets (data) are exchanged between tiles using the switching fabric. It is clear from this explanation that the switching fabric has no state—the movement of each datum is predetermined by the particular set of wires to which the input of each multiplexer is switched.

In the exchange phase, an all tiles to all tiles communication is enabled. The exchange phase can have multiple cycles. Each tile 4 has control of its own unique input multiplexer 210. Incoming traffic from any other tile in the chip, or from one of the connection links can be selected. Note that it is possible for a multiplexer to be set to receive a 'null' input—that is, no input from any other tile in that particular exchange phase. Selection can change cycle-by-cycle within an exchange phase; it does not have to be constant throughout. Data may be exchanged on chip, or from chip to chip or from chip to host depending on the link which is selected. The present application is concerned mainly with inter-tile communication on a chip. To perform synchronisation on the chip, a small number of pipelined signals are provided from all of the tiles to a sync controller 36 on the chip and a pipelined sync-ack signal is broadcast from the sync controller back to all tiles. In one embodiment the pipelined signals are one-bit-wide daisy chained AND/OR signals. One mechanism by which synchronisation between tiles is achieved is the SYNC instruction mentioned above, or described in the following. Other mechanism may be utilised: what is important is that all tiles can be synchronised between a compute phase of the chip and an exchange phase of the chip (FIG. 3). The SYNC instruction triggers the following functionality to be triggered in dedicated synchronization logic on the tile 4, and in the synchronization controller 36. The synch controller 36 may be implemented in the hardware interconnect 34 or, as shown, in a separate on chip module. This functionality of both the on-tile sync logic and the synchronization controller 36 is implemented in dedicated hardware circuitry such that, once the "SYNC chip" instruction is executed, the rest of the functionality proceeds without further instructions being executed to do so.

Firstly, the on-tile sync logic causes the instruction issue for the supervisor on the tile 4 in question to automatically pause (causes the fetch stage 14 and scheduler 24 to suspend issuing instructions of the supervisor). Once all the outstanding worker threads on the local tile 4 have performed an EXIT, then the sync logic automatically sends a synchronization request "sync_req" to the synchronization controller 36. The local tile 4 then continues to wait with the supervisor instruction issue paused. A similar process is also implemented on each of the other tiles 4 in the array 6 (each comprising its own instance of the sync logic). Thus at some point, once all the final workers in the current compute phase 52 have EXITed on all the tiles 4 in the array 6, the synchronization controller 36 will have received a respective synchronization request (sync_req) from all the tiles 4 in the array 6. Only then, in response to receiving the sync_req from every tile 4 in the array 6 on the same chip 2, the synchronization controller 36 sends a synchronization acknowledgement signal "sync_ack" back to the sync logic on each of the tiles 4. Up until this point, each of the tiles 4 has had its supervisor instruction issue paused waiting for the synchronization acknowledgment signal (sync_ack). Upon receiving the sync_ack signal, the sync logic in the tile 4 automatically unpauses the supervisor instruction issue for the respective supervisor thread on that tile 4. The supervisor is then free to proceed with exchanging data with other tiles 4 in via the interconnect 34 in a subsequent exchange phase 50.

Preferably the sycn_req and sync_ack signals are transmitted and received to and from the synchronization controller, respectively, via one or more dedicated sync wires connecting each tile 4 to the synchronization controller 36 in the interconnect 34.

The connection structure of the tile will now be described in more detail.

Each tile has three interfaces:
- an exin interface 224 which passes data from the switching fabric 34 to the tile 4;
- an exout interface 226 which passes data from the tile to the switching fabric over the broadcast exchange bus 218; and
- an exmux interface 228 which passes the control mux signal 214 (mux-select) from the tile 4 to its multiplexer 210.

Figure 4:
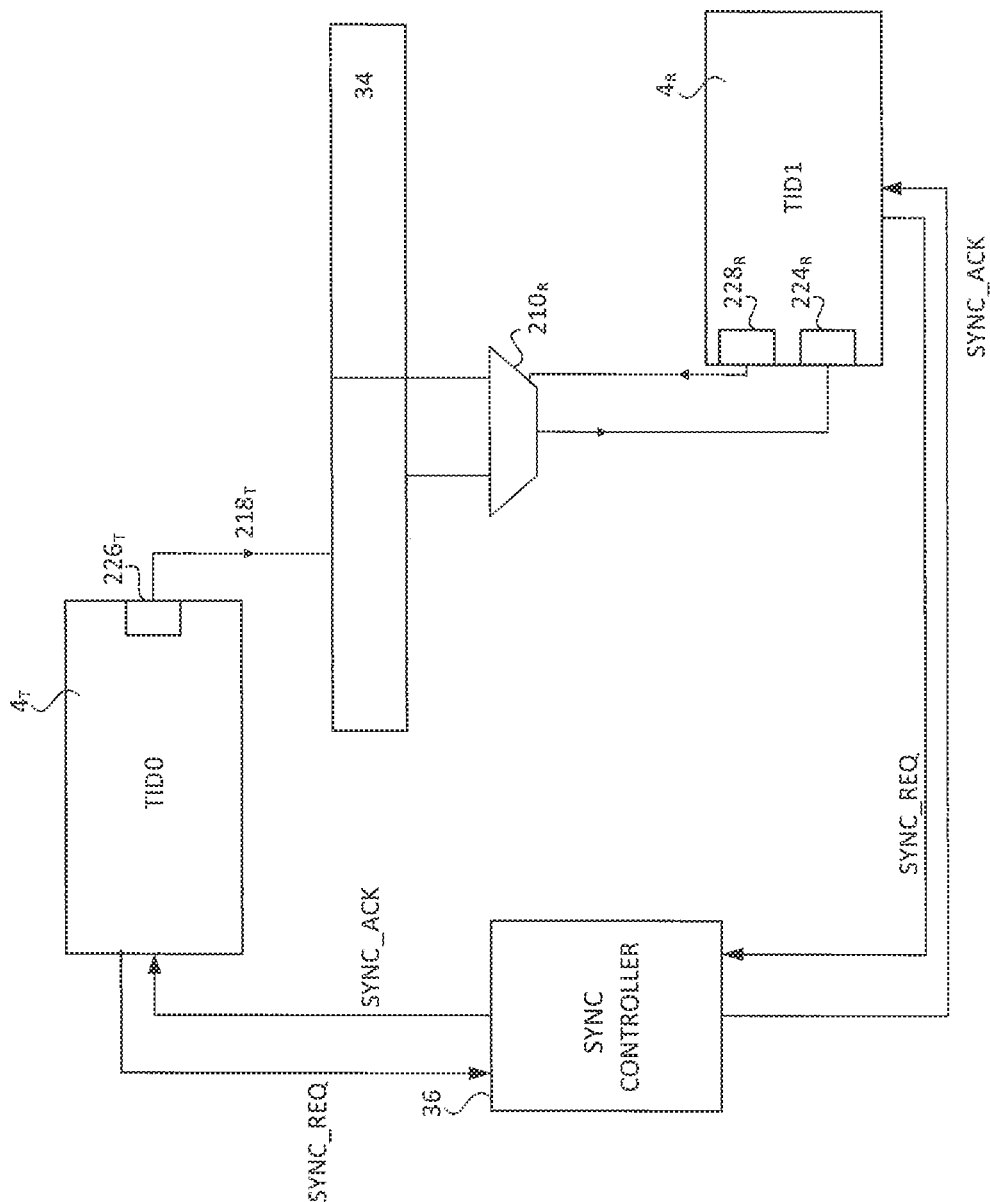
FIG. 4 is a schematic diagram showing two tiles in a time deterministic exchange.

In order to ensure each individual tile executes SEND instructions and switch control instructions at appropriate times to transmit and receive the correct data, exchange scheduling requirements need to be met by the programmer or compiler that allocates individual programs to the individual tiles in the computer. This function is carried out by an exchange scheduler which needs to be aware of the following exchange timing (BNET) parameters. In order to understand the parameters, a simplified version of FIG. 2 is shown in FIG. 4. FIG. 4 also shows a recipient tile as well as a transmitting tile.

I. The relative SYNC acknowledgement delay of each tile, BNET_RSAK (TID). TID is the tile identifier held in a TILE_ID register described later. This is a number of cycles always greater than or equal to 0 indicating when each tile receives the ack signal from the sync controller 36 relative to the earliest receiving tile. This can be calculated from the tile ID, noting that the tile ID indicates the particular location on the chip of that tile, and therefore reflects the physical distances. FIG. 4 shows one transmitting tile $4_T$, and one recipient tile $4_R$. Although shown only schematically and not to scale, the tile $4_T$ is indicated closer to the sync controller and the tile $4_R$ is indicated being further away, with the consequence that the sync acknowledgement delay will be shorter to the tile $4_T$ than for the tile $4_R$. A particular value will be associated with each tile for the sync acknowledgement delay. These values can be held for example in a delay table, or can be calculated on the fly each time based on the tile ID.

II. The exchange mux control loop delay, BNET_MXP (TID of receiving tile). This is the number of cycles between issuing an instruction (PUTi-MUXptr) that changes a tile's input mux selection and the earliest point at which the same tile could issue a (hypothetical) load instruction for exchange data stored in memory as a result of the new mux selection. Looking at FIG. 4, this delay comprises the delay of the control signal getting from the exmux interface $228_R$ of recipients tile $4_R$ to its multiplexer $210_R$ and the length of the line from the output of the multiplexer to the data input exin interface 224.

III. The tile to tile exchange delay, BNET_TT (TID of sending tile, TID of receiving tile). This is the number of cycles between a SEND instruction being issued on one tile and the earliest point at which the receiving tile could issue a (hypothetical) load instruction pointing to the sent value in its own memory. This has been determined from the tile IDs of the sending and receiving tiles, either by accessing a table such as has already been discussed, or by calculation. Looking again at FIG. 4, this delay comprises the time taken for data to travel from transmit tile $4_T$ from its ex_out interface $226_T$ to the switching fabric 3 along its exchange bus $218_T$ and then via the input mux $210_R$ at the receiving tile $4_R$ to the ex_in interface $224_R$ of the receiving tile.

IV. The exchange traffic memory pointer update delay, BNET_MMP( ). This is the number of cycles between issuing an instruction (PUTi-MEMptr) that changes a tile's exchange input traffic memory pointer and the earliest point at which that same tile could issue a (hypothetical) load instruction for exchange data stored in memory as a result of the new pointer. This is a small, fixed number of cycles. The memory pointer has not yet been discussed, but is shown in FIG. 2 referenced 232. It acts as a pointer into the data memory 202 and indicates where incoming data from the ex_in interface 224 is to be stored. This is described in more detail later.

Figure 5:
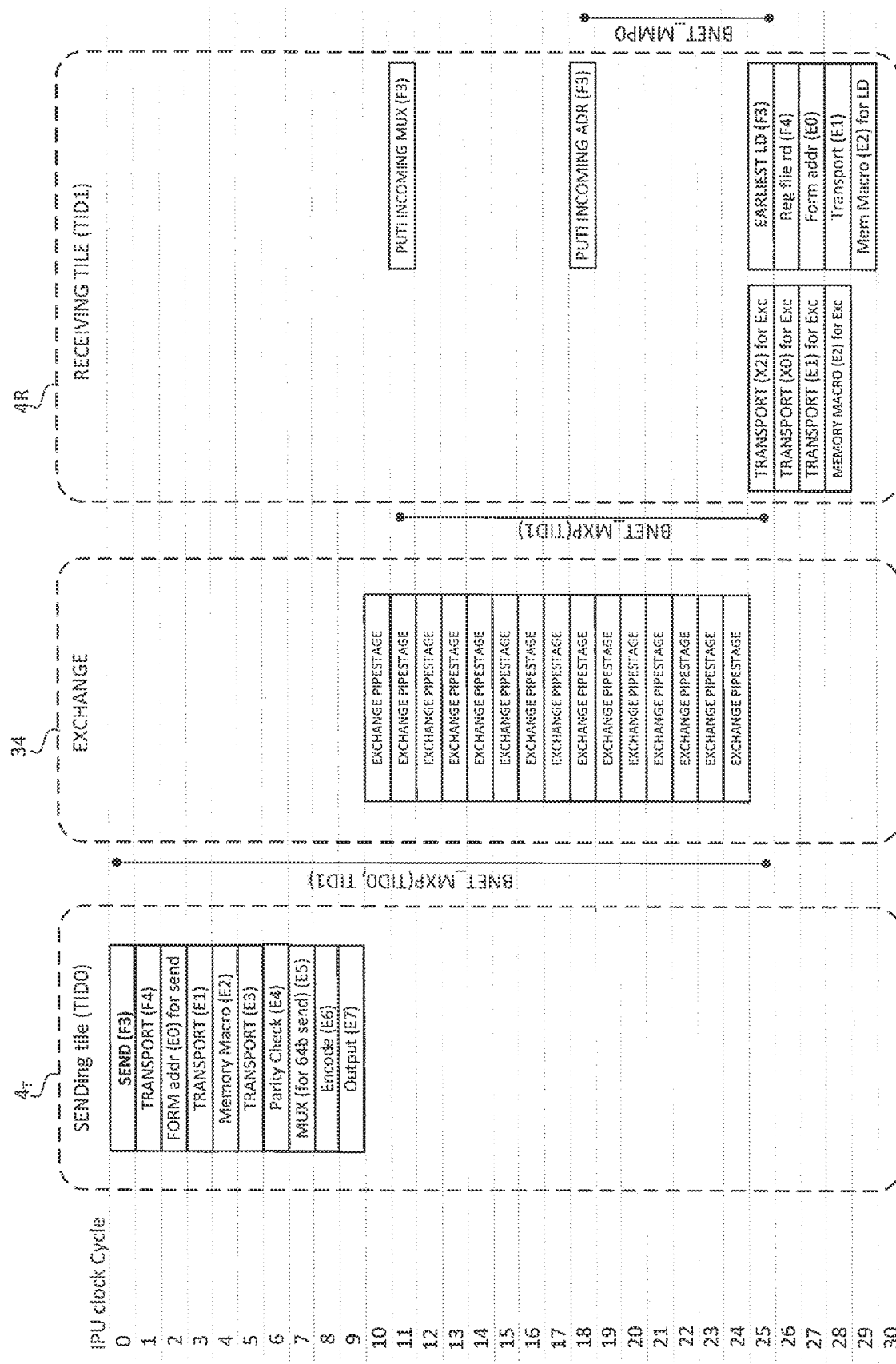
FIG. 5 is a schematic timing diagram illustrating a time deterministic exchange.

FIG. 5 shows the exchange timings in more depth. On the left-hand side of FIG. 4 is the IPU clock cycles running from 0-30. Action on the sending tile $4_T$ occurs between IPU clock cycles 0 and 9, starting with issuance of a send instruction (SEND $F_3$). In IPU clock cycles 10 through 24, the datum pipelines its way through the switching fabric 34.

Looking at the receiving (or recipient) tile $4_R$ in IPU clock cycle 11 a PUTi instruction is executed that changes the tile input mux selection: PUTi-MXptr ($F_3$). In FIG. 5, this PUTi instruction is labelled as "PUTi INCOMING MUX (F3)".

In cycle 18, the memory pointer instruction is executed, PUTi-MEMptr ($F_3$), allowing for a load instruction in ITU clock cycle 25. In FIG. 5, this PUTi instruction is labelled as "PUTi INCOMING ADR (F3)".

On the sending tile $4_t$, IPU clock cycles 1, 3 and 5 are marked "Transport ( )". This is an internal tile delay between the issuance of a SEND instruction and the manifestation of the data of the SEND instruction on the exout interface. F4, E1, E3 etc. denote datum from earlier SEND instructions in transport to the exout interface. IPU clock cycle 2 is allocated to forming an address EO for a SEND instruction. Note this is where EO is to be fetched from, not its destination address. In IPU clock cycle 4 a memory macro is executed to fetch E2 from memory. In IPU clock cycle 6 a parity check is performed on E4. In IPU clock cycle 7 a MUX output instruction is executed to send E5. In IPU clock cycle 8 E6 is encoded and in IPU clock cycle E7 is output.

In the exchange fabric 34, IPU clock cycles 10 through 24 are labelled "exchange pipe stage". In each cycle, a datum moves "one step" along the pipeline (between temporary stores).

Cycles 25-28 denote the delay on the recipient tile $4_R$ between receiving a datum at the exin interface (see Mem Macro (E2) for Exc), while cycles 25-29 denote the delay between receiving a datum at the exin interface and loading it into memory (see Mem Macro (E2)) for LD. Other functions can be carried out in that delay—see Earliest LD (F3), Reg file rd (F4), form adds (EO), Transport (E1).

In simple terms, if the processor of the receiving tile $4_R$ wants to act on a datum (e.g. F3) which was the output of a process on the transmitting tile $4_T$, then the transmitting tile $4_T$ has to execute a SEND instruction [SEND (F3) at a certain time (e.g. IPU clock cycle 0 in FIG. 5), and the receiving tile has to execute a switch control instruction PUTi EXCH MXptr (as in IPU clock cycle 11) by a certain time relative to the execution of the SEND instruction [SEND (F3)] on the transmitting tile. This will ensure that the data arrives at the recipient tile in time to be loaded [earliest LD (F3)] in IPU cycle 25 for use in a codelet being executed at the recipient tile.

Note that the receive process at a recipient tile does not need to involve setting the memory pointer as with instruction PUTi MEMptr. Instead, the memory pointer 232 (FIG. 2) automatically increments after each datum is received at the exin interface 224. Received data is then just loaded into the next available memory location. However, the ability to change the memory pointer enables the recipient tile to alter the memory location at which the datum is written. All of this can be determined by the compiler or programmer who writes the individual programs to the individual tiles such that they properly communicate. This results in the timing of an internal exchange (the inter exchange on chip) to be completely time deterministic. This time determinism can be used by an exchange scheduler to highly optimise exchange sequences.

Figure 6:
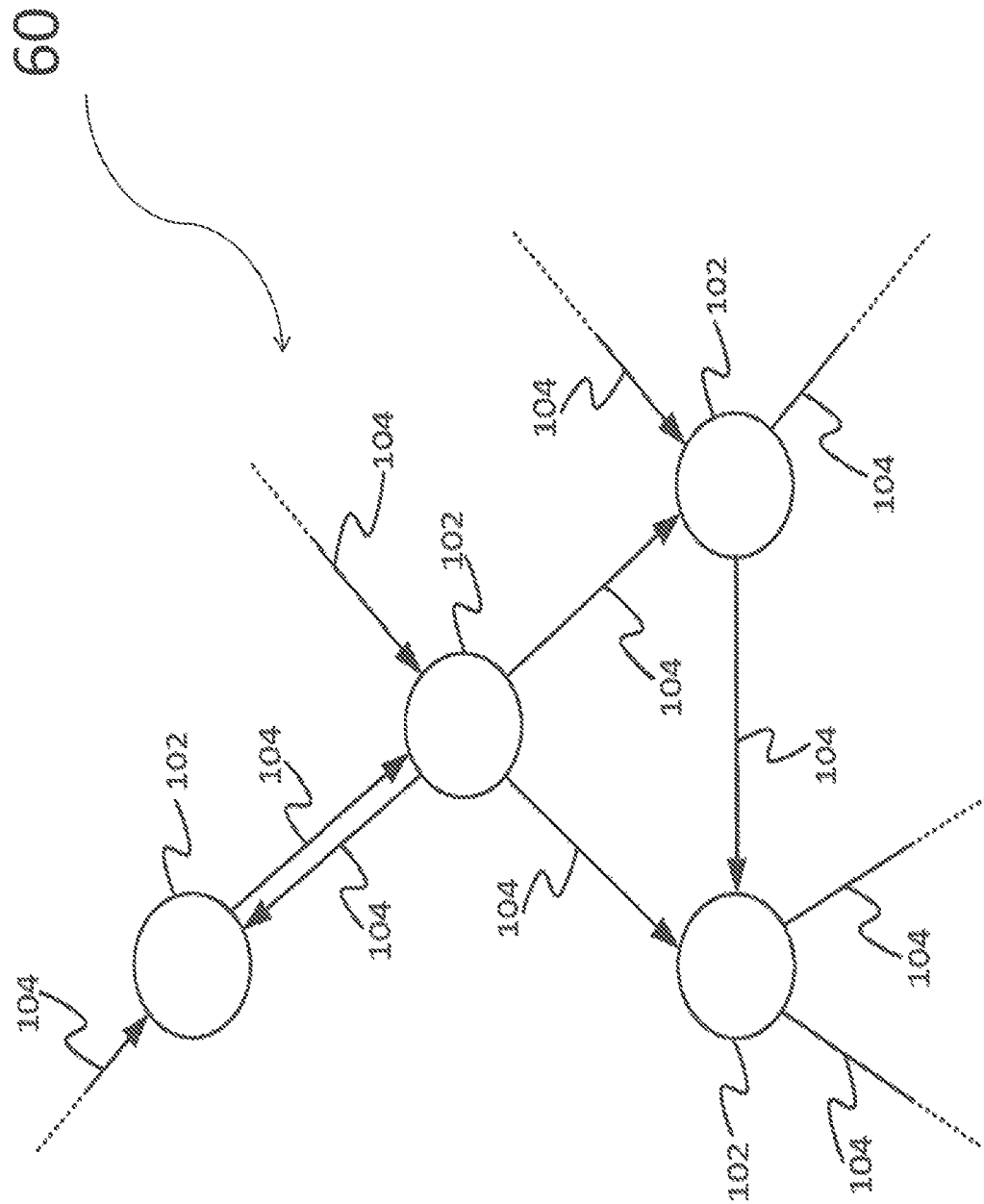
FIG. 6 is one example of a machine intelligence graph.

FIG. 6 illustrates an example application of the processor architecture disclosed herein, namely an application to machine intelligence.

As mentioned previously and as will be familiar to a person skilled in the art of machine intelligence, machine intelligence begins with a learning stage where the machine intelligence algorithm learns a knowledge model. The model may be represented as a graph 60 of interconnected nodes 102 and links 104. Nodes and links may be referred to as vertices and edges. Each node 102 in the graph has one or more input edges and one or more output edges, wherein some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Each edge 104 communicates a value commonly in the form of a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. These results are sometimes referred to as activations. Each function is parameterized by one or more respective parameters (sometimes referred to as weights, though they need not necessarily be multiplicative weights). In general the functions represented by the different nodes 102 may be different forms of function and/or may be parameterized by different parameters.

Further, each of the one or more parameters of each node's function is characterized by a respective error value. Moreover, a respective error condition may be associated with the error(s) in the parameter(s) of each node 102. For a node 102 representing a function parameterized by a single error parameter, the error condition may be a simple threshold, i.e. the error condition is satisfied if the error is within the specified threshold but not satisfied if the error is beyond the threshold. For a node 102 parameterized by more than one respective parameter, the error condition for that node 102 may be more complex. For example, the error condition may be satisfied only if each of the parameters of that node 102 falls within a respective threshold. As another example, a combined metric may be defined combining the errors in the different parameters for the same node 102, and the error condition may be satisfied on condition that the value of the combined metric falls within a specified threshold, but otherwise the error condition is not satisfied if the value of the combined metric is beyond the threshold (or vice versa depending on the definition of the metric). Whatever the error condition, this gives a measure of whether the error in the parameter(s) of the node falls below a certain level or degree of acceptability.

In the learning stage the algorithm receives experience data, i.e. multiple data points representing different possible combinations of inputs to the graph. As more and more experience data is received, the algorithm gradually tunes the parameters of the various nodes 102 in the graph based on the experience data so as to try to minimize the errors in the parameters. The goal is to find values of the parameters such that, the output of the graph is as close as possible to a desired result As the graph as a whole tends toward such a state, the calculation is said to converge.

For instance, in a supervised approach, the input experience data takes the form of training data, i.e. inputs which correspond to known outputs. With each data point, the algorithm can tune the parameters such that the output more closely matches the known output for the given input. In the subsequent prediction stage, the graph can then be used to map an input query to an approximate predicted output (or vice versa if making an inference). Other approaches are also possible. For instance, in an unsupervised approach, there is no concept of a reference result per input datum, and instead the machine intelligence algorithm is left to identify its own structure in the output data. Or in a reinforcement approach, the algorithm tries out at least one possible output for each data point in the input experience data, and is told whether this output is positive or negative (and potentially a degree to which it is positive or negative), e.g. win or lose, or reward or punishment, or such like. Over many trials the algorithm can gradually tune the parameters of the graph to be able to predict inputs that will result in a positive outcome. The various approaches and algorithms for learning a graph will be known to a person skilled in the art of machine learning.

According to an exemplary application of the techniques disclosed herein, each worker thread is programmed to perform the computations associated with a respective individual one of the nodes 102 in a machine intelligence graph. In this case the edges 104 between nodes 102 correspond to the exchanges of data between threads, at least some of which may involve exchanges between tiles.

Figure 7:
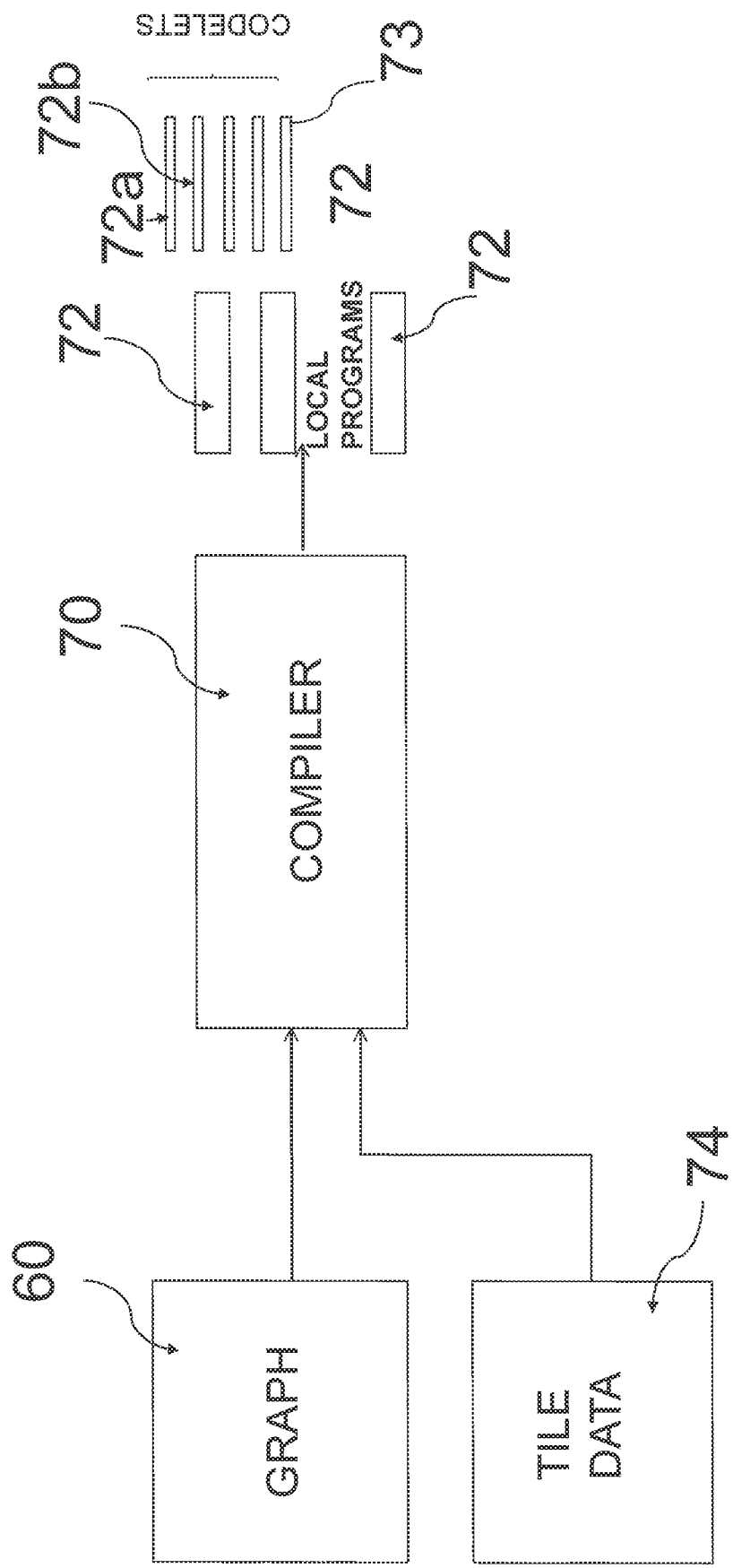
FIG. 7 is a schematic architecture illustrating operation of a compiler for generating time deterministic programs.

FIG. 7 is a schematic diagram illustrating the function of a compiler 70. The compiler receives such a graph 60 and compiles the functions in the graph into a multiplicity of codelets, which are contained into local programs labelled 72 in FIG. 7. Each local program is designed to be loaded into a particular tile of the computer. Each program comprises one or more codelets 72a, 72b . . . plus a supervisor sub-program 73 each formed of a sequence of instructions. The compiler generates the programs such that they are linked to each other in time, that is they are time deterministic. In order to do this the compiler accesses tile data 74 which includes tile identifiers which are indicative of the location of the tiles and therefore the delays which the compiler needs to understand in order to generate the local programs. The delays have already been mentioned above, and can be computed based on the tile data. Alternatively, the tile data can incorporate a data structure in which these delays are available through a lookup table.

Figure 8:
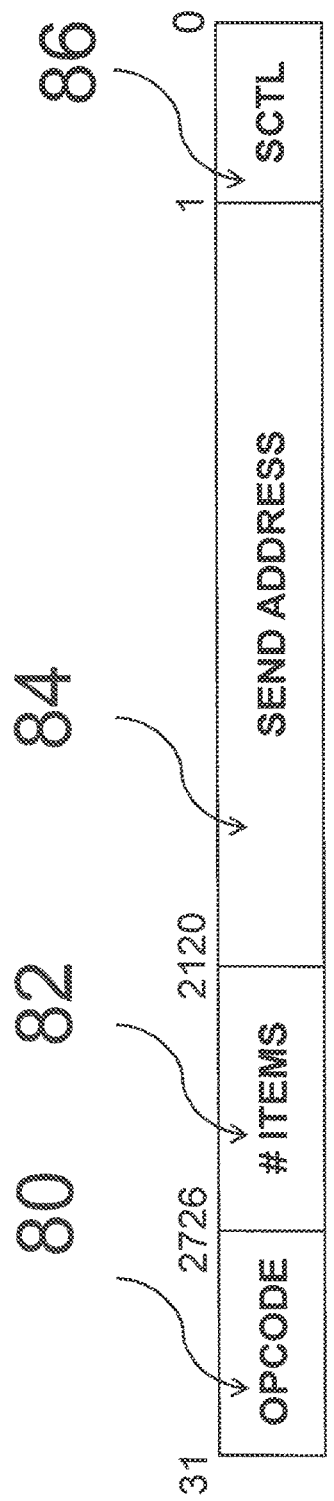

There now follows a description of novel instructions which have been developed as part of the instruction set for the computer architecture defined herein. FIG. 8 shows a SEND instruction of 32 bits. A SEND instruction indicates a data transmission from tile memory. It causes one or more data stored at a particular address in the local memory 22 of a tile to be transmitted at the exout interface of a tile. Each datum (referred to as "item" in the instruction) can be one or more words long. A SEND instruction acts on one word or multiple words to implement a send function. The SEND instruction has an opcode 80, a field 82 denoting a message count, the number of items to be sent in the form of one or more packet from the SEND address denoted in an address field 84. The field 84 defines the address in the local memory from which the items are to be sent in the form of an immediate value which is added to a base value stored in a base address register. The SEND instruction also has a send control field 86 (SCTL) which denotes the word size, selected as one of 4 and 8 bytes. The packet has no destination identifier in it: In other words, the recipient tile which is to receive the items is not uniquely identified in the instruction. The send function causes the specified number of data items from the send address to be accessed from the local memory and placed at the ex_out interface of the tile to be transmitted at the next clock cycle. In another variation of the SEND instruction, the address from which items are to be sent could be implicit; taken from base value in the base address register and a delta value in an outgoing delta register. The delta value may be set based on information in a previous SEND instruction. In place of a unique identifier of the intended recipient tile, the compiler has arranged that the correct recipient tile will switch its local multiplexer(s) at the correct time to receive the datum (data items) as already described herein. Note that an intended recipient tile could be the transmitting tile itself in some cases.

Figure 9:
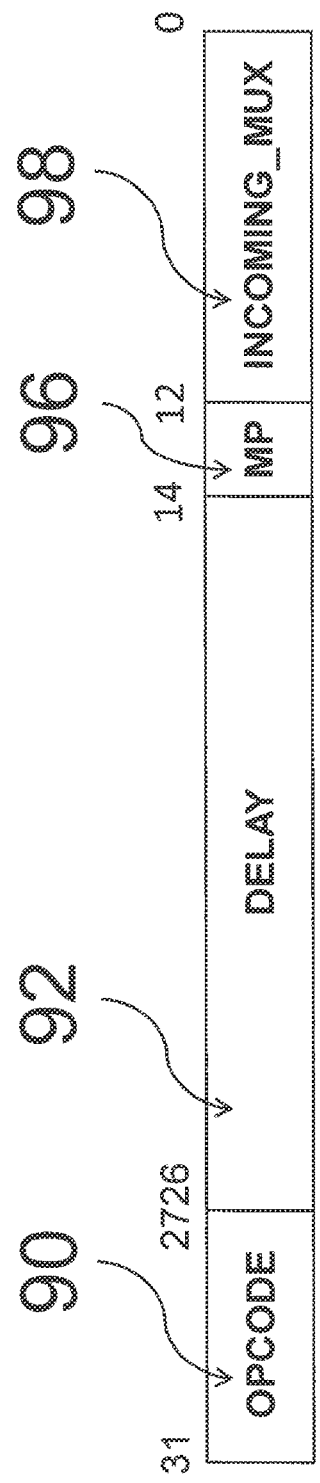

To this end, a switch control function is provided, as described above. FIG. 9 illustrates a PUT-i-MUX instruction which performs this function. An opcode field 90 defines the instruction as a PUT-i-MUX instruction. A delay period can be specified by a delay immediate value 92. This delay value can be used to replace 'no op' instructions, and is a way to optimise code compression. This instruction, when executed, defines in incoming_mux field 98 which input of the multiplexer 210 is to be set to 'listen' for items which have been sent from another tile. For the sake of compactness, this mux control function could be combined in a single instruction with a send function defined above, as shown in FIG. 10. Note that there is no connection between the send function, which causes the tile to act as a transmitting tile, and the switch control function, which is a function when the tile is acting as a recipient tile, other than that they can be performed in a single execution cycle on the same tile.

FIG. 10 is an example of a "merge" instruction. In this context, a "merge" instruction means an instruction that defines two or more functions which can be carried out at the same time (in one execution cycle) on one tile FIG. 10 illustrates a form of 'merge' send instruction, wherein a send function is combined with a second function which can modify the state held in registers at the tile. One function is to change the memory pointer for data received at that tile. Another function is to set the incoming MUX. The PUTi MEMptr function enables a memory location in the local memory at which the next datum received by the tile is to be loaded to be identified. This function could be carried out by a dedicated 'receive' instruction, although its function is not to enable receipt of a datum but to modify the memory pointer. In fact, no specific instruction needs to be executed to receive data at a tile. Data arriving at the exin interface will be loaded into the next memory location identified by the memory pointer, under the control of the exin interface. The instruction of FIG. 10 has opcode field 100 and a number of items to be sent field 102. The immediate value in incoming state modification field 106 is written to an exchange configuration state register specified by field 104. In one form, the state modification field 106 may write an incoming delta for calculating the receive address to which the memory pointer is to be set. In another form the exchange configuration state is written with the incoming MUX value which sets the multiplexer input.

For this form of "merge" instructions, the send function uses a send address determined from values stored in one or more registers which is implicit in the instruction. For example, the send address can be determined from the base register and the delta register.

FIG. 11 shows a "double width" instruction, referred to as an exchange instruction (EXCH). This instruction initiates a data transmission from an indicated address in the tile memory and sets the incoming exchange configuration state (the multiplexer and/or the memory pointer for receiving data). The EXCH instruction is unique in that it is immediately followed by an inline 32-bit payload, located at the memory location immediately after the instructions. The EXCH instruction has an opcode field 110 which denotes an exchange instruction EXCH. The payload has a 'coissue' flag 119.

The EXCH instruction includes format field 112 which has a single bit which specifies incoming format datum width (32 bits or 64 bits). The datum width can have implications on the setting of the multiplexer lines (whether they are set singly or in pairs). An item field 114 defines the number of items which are caused to be sent by the exchange instruction. These items are sent from a sent address calculated using the immediate in field 116, as in the send instruction of FIG. 9. The value in this field is added to the value in the base register.

Reference numeral 118 denotes a control field which defines word size for the send datum. The payload includes a switch control field 120 which acts a switch control for the incoming multiplexer, as described above in connection with FIG. 9. Numeral 122 denotes a field of the payload defining an incoming delta for calculating the address at which incoming data is to be stored, as described above in connection with the instruction of FIG. 10. The 64 bit wide exchange instruction EXCH of FIG. 11 can be executed every clock cycle and thus allows simultaneously:

sending from a particular address
updating of incoming mux
updating of incoming address Thus, any exchange schedule can be encoded in a single instruction. The instructions of FIGS. 8, 9 and 10 perform similar functions but as they are only 32 bits long can be used to minimize the size of the exchange code in the local memory of each tile. The decision about which instruction to use in any particular context is made at the compiler 70 when constructing the codelets for the local program 72.

There follows a list of key registers and their semantics to support the above instructions. These registers from part of the register file on each tile.

| | |
|---|---|
| TILE_ID | Holds a unique identifier for that tile |
| INCOMING_MUX | Holds the Tile ID of the source tile for incoming messages, which acts to select the 'listening' input for the multiplexer associated with the receiving Tile. |
| INCOMING_DELTA | This holds an auto incrementing value for calculating on address at which incoming data are to be stored: it can be overwritten by an explicit field [e.g. see FIG. 10]. It is added to INCOMING_BASE. |
| INCOMING_BASE | This holds a common base address for updating memory pointer (added to INCOMING_DELTA). |
| OUTGOING_BASE | This holds a common base address for send instructions |
| OUTGOING_DELTA | This holds delta for calculating send addresses instructions A 'send' address is outgoing base + outgoing delta. |
| INCOMING_FORMAT | Identifies 32b or 64b incoming datum. |

Note that the INCOMING_DELTA and INCOMING_MUX register form part of the exchange state of tile.

There has been described herein a new computer paradigm which is particularly effective in the context of knowledge models for machine learning. An architecture is provided which utilises time determinism as in an exchange phase of a BSP paradigm to efficiently process very large amounts of data. While particular embodiments have been described, other applications and variance of the disclosed techniques may become apparent to a person skilled in the art once given the disclosure hearing. The scope of the present disclosure is not limited by the described embodiments but only by the accompanying claims.

What is claimed is:

1. A device comprising:
a first processing unit, having a first memory for storing a first local program and a first execution unit for executing instructions of the first local program, wherein the first processing unit is configured to operate in a first compute phase, during which the first execution unit performs computations, and an exchange phase, during which the first processing unit exchanges data;
a second processing unit, having a second memory for storing a second local program and a second execution unit for executing instructions of the second local program, wherein the second processing unit is configured to operate in a second compute phase, during which the second execution unit performs computations, and the exchange phase, during which the second processing unit exchanges data;
a switching fabric comprising a plurality of connecting wires configured to exchange the data between the first processing unit and the second processing unit; and
synchronisation controller circuitry configured to issue a synchronisation signal to the first processing unit and the second processing unit, wherein a thread running on the first execution unit is configured to proceed to the exchange phase in response to receipt of the synchronisation signal at the first processing unit,
wherein the first execution unit is configured to, during the exchange phase, execute a send instruction from the first local program to transmit, during a first clock cycle that is defined at compile time, a data packet over the switching fabric,
wherein the switching fabric is configured to transport the data packet to the second processing unit in a predefined number of clock cycles, such that the data packet is received at the second processing unit at a receive time that is defined at compile time.

2. The device of claim 1, wherein the first processing unit and the second processing unit comprise sync logic configured to issue a synchronisation request to the synchronisation controller circuitry prior to the exchange phase,
wherein the synchronisation controller circuitry is configured to issue the synchronisation signal in response to receipt of all of the synchronisation requests from the first processing unit and the second processing unit.

3. The device of claim 1, wherein the second execution unit is configured to execute a switch control instruction to cause a multiplexer to connect the second processing unit to at least one of the connecting wires so as to receive the data packet at the receive time.

4. The device of claim 1, wherein the second execution unit is configured to execute a switch control instruction at a compiler-defined time relative to execution of the send instruction so as to cause a multiplexer to connect the second processing unit to at least one of the connecting wires so as to receive the data packet.

5. The device of claim 1, wherein the send instruction defines a number of data packets to be sent, each data packet being associated with a different compiler-defined transmit time.

6. The device of claim 1, wherein a first one of the connecting wires is associated with the first processing unit, and wherein a second one of the connecting wires is associated with the second processing unit.

7. The device of claim 1, wherein at least one of the connecting wires comprises at least one pipelined connecting wire comprising a series of temporary stores, each of the temporary stores holding the data packet for one of the predefined number of clocks cycles during transport of the data packet.

8. The device of claim 1, wherein the switching fabric is stateless.

9. The device of claim 1, wherein the device further comprises:
a first multiplexer associated with the first processing unit and configured to operate in response to a first switch control signal from the first processing unit to connect the first processing unit to the switching fabric; and
a second multiplexer associated with the second processing unit and configured to operate in response to a second switch control signal from the second processing unit to connect the second processing unit to the switching fabric.

10. The device of claim 1, wherein the first compute phase and the exchange phase are separated by a barrier synchronisation in which the first processing unit participates, and wherein the second compute phase and the exchange phase are separated by the barrier synchronisation in which the second processing unit participates.

11. The device of claim 1, wherein the second processing unit comprises an input interface configured to store the data packet into a memory location identified by a memory pointer of the second processing unit.

12. The device of claim 11, wherein the second execution unit is configured to, during a second clock cycle prior to the receive time, execute an instruction to update the memory pointer, wherein the second clock cycle is defined during compile time.

13. The device of claim 1, wherein the device is an integrated circuit.

14. The device of claim 1, wherein the device is a multi-tile processor, the first processing unit comprises a first tile of the multi-tile processor, and the second processing unit comprises a second tile of the multi-tile processor.

15. The device of claim 1, comprising a clock connected to the first processing unit and to the second processing unit and configured to control timing of device activity.

16. The device of claim 1, wherein the first execution unit is configured to execute a first synchronisation instruction, which generates a first indication that the first compute phase has completed, and
wherein the second execution unit is configured to execute a second synchronisation instruction, which generates a second indication that the second compute phase has completed.

17. The device of claim 1, wherein the first execution unit is configured to execute the send instruction at a time that is compiler-defined and relative to timing of other instructions being executed on the second processing unit.

18. The device of claim 1, wherein the send instruction is a merged instruction, which merges a send function with one or more additional functions.

19. A method comprising:
storing in a first processing unit, a first local program, wherein the first local program when executed causes the first processing unit to operate in a first compute phase, during which the first processing unit performs computations, and an exchange phase, during which the first processing unit exchanges data;
storing in a second processing unit, a second local program, wherein the second local program when executed causes the second processing unit to operate in a second compute phase, during which the second processing unit performs computations, and the exchange phase, during which the second processing unit exchanges data;
issuing a synchronisation signal to each of the first processing unit and to the second processing unit;
the first processing unit and the second processing unit, proceeding to the exchange phase in response to receipt of the synchronisation signal;
the first processing unit, during the exchange phase, executing a send instruction from the first local program to transmit, during a first compiler-defined clock cycle, a data packet over at least one connecting wire,
transporting, over the at least one connecting wire, the data packet to the second processing unit in a number of clock cycles, such that the data packet is received at the second processing unit at a second compiler-defined clock cycle.

20. The method of claim 19, wherein the send instruction defines a quantity of data packets to be sent, each data packet of the quantity being associated with a different compiler-defined transmit time.

21. The method of claim 19, further comprising:
executing a switch control instruction to cause a multiplexer to connect the second processing unit to the at least one connecting wire so as to receive the data packet at the second compiler-defined clock cycle.

22. The method of claim 19, wherein the synchronisation signal is issued in response to receipt of synchronisation requests from the first processing unit and the second processing unit.

23. The method of claim 19, wherein the first compute phase and the exchange phase are separated by a barrier synchronisation in which the first processing unit participates, and wherein the second compute phase and the exchange phase are separated by the barrier synchronisation in which the second processing unit participates.

24. A non-transitory computer readable medium comprising a first local program associated with a first processing unit and a second local program associated with a second processing unit, wherein the first local program comprises a first set of computer readable instructions, which when executed on the first processing unit causes the first processing unit to:
operate in a compute phase, during which the first processing unit performs computations, and an exchange phase, during which the first processing unit exchanges data with the second processing unit; and
proceed to the exchange phase in response to receipt of a synchronisation signal at the first processing unit,
wherein the first set of computer readable instructions comprises a send instruction that is arranged to be executed by the first processing unit during the exchange phase, so as to cause the first processing unit to transmit, during a first compiler-defined clock cycle, a data packet over at least one connecting wire,
wherein the second local program comprises a second set of computer readable instructions, and wherein the second set of computer readable instructions comprises a switch control instruction that is arranged to be executed by the second processing unit so as to cause a multiplexer to connect the second processing unit to the at least one connecting wire so as to receive the data packet at a second compiler-defined clock cycle.

* * * * *